UNITED STATES PATENT OFFICE.

HUGH McCORMICK, OF SAN FRANCISCO, CALIFORNIA.

PREPARING TALC AND COATING ARTICLES THEREWITH.

SPECIFICATION forming part of Letters Patent No. 253,616, dated February 14, 1882.

Application filed November 12, 1881. (No specimens.)

*To all whom it may concern:*

Be it known that I, HUGH McCORMICK, of the city and county of San Francisco, State of California, have invented Improvements in Preparing Talc and Coating Articles therewith; and I hereby declare the following to be a full, clear, and exact description thereof.

My invention relates to certain improvements in preparing talc and coating articles therewith; and it consists of the preparation and process as follows: The substance used is known as "talc," or "foliated" or "Japanese" talc—a well-known magnesian mineral of a soft, soapy feel, found in large quantities under natural conditions in mines, &c. It is foliated and easily crushed or powdered, and occurs generally in a creamy-white color. After taking the ore from the mine I first wash it to cleanse it of impurities. This is done by placing it in a vessel and allowing a stream of water to run into the vessel and pass off. The whole mass is agitated by suitable devices, and with the outflowing water the talc floats off, and the washing is continued as long as any of the talc will float away. The water and talc is run or decanted into another vessel, and remains there until settled, the water being then poured or drawn off, leaving the talc at the bottom. The mineral thus cleaned I treat as follows: Taking a quantity sufficient for the purpose in hand, I add water to moisten it. I then add linseed-oil or varnish of some kind to give it an adhesive quality and cause it to dry hard. If this preparation is not of the required consistency, as it will generally be too thick, add sufficient alcohol, water, or turpentine to reduce it. It is then applied with a brush, as in the case of paint. It can be used on wood, metals, leather, paper, cloth, porcelain, plaster walls, glass, and on any substance upon which paint is or may be used. Its application will give to the substance a lustrous, creamy appearance, the effect of which is very beautiful.

In the above process, if no water be used, the talc will be darker in color and have but little luster, so that I regard its presence as necessary to the success of the preparation.

This preparation of the talc is intended to be used more especially as paint is used. For other purposes requiring more delicate work—as for applying to cards, paper, printing, writing, &c.—I prepare it with other materials. If the talc is too coarse, I grind it as fine as desired and add a solution in water of glue, gelatine, silicates of soda or potash, or any such substance, to make it adhere and harden when dry. I then add water to make it the required consistency. It is to be used with a brush or pen. Its effect upon the substances to which it is applied is the same as I have already explained. It may be applied to visiting or business cards, bill-heads, as. a ground for wall-paper, or as printing material for the same. It may also be used as an ink for printing, and may be put on wall-papers with a brush, by hand, or by revolving brushes.

This talc may be applied to paper or cards in the following manner, as well as the manner which I have explained. After thoroughly cleaning it, pulverize it and dust it on the paper through a sieve or screen while the paper is moist with water, and then pass said paper through rolls. This will provide a fine bright surface, the talc being in coarse or fine scales, as desired.

I am aware that heretofore talc has been used in conjunction with paraffine for surfacing cardboard, and hence I make no broad claim to it for the purpose of surfacing, but confine myself to my particular method for preparing it for the subsequent use.

Having thus described my invention, what I claim as new, and desire to secure by Letters Patent, is—

The method herein described for preparing talc for coating articles therewith, consisting in first cleaning it with water, then drying it and again moistening it with water, and then adding some substance to give it adhesion and cause it to dry hard—such as linseed-oil, varnish, glue, gelatine, silicates of soda or potassa, &c.—and reducing it to the required consistency with water, alcohol, or turpentine, &c., and then applying it with a brush or pen to any substance, substantially as herein described.

In witness whereof I have hereunto set my hand.

HUGH McCORMICK.

Witnesses:
S. H. NOURSE,
JEROME F. KENDALL.